Figure 1:
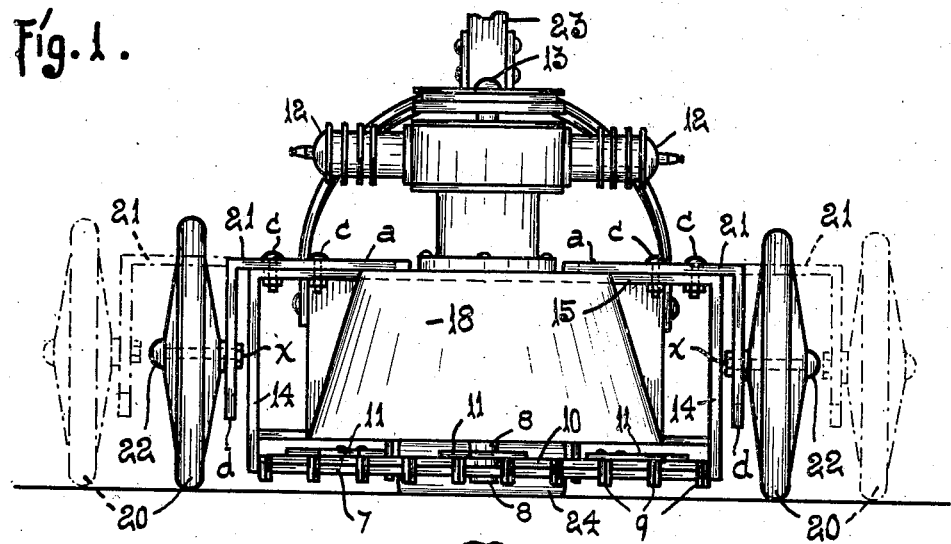

July 11, 1939.　　　　C. IVERSON　　　　2,165,551
LAWN MOWER
Filed Sept. 22, 1938　　　2 Sheets-Sheet 1

INVENTOR.
BY Christian Iverson,
Hiram A. Sturges
ATTORNEY.

July 11, 1939.  C. IVERSON  2,165,551

LAWN MOWER

Filed Sept. 22, 1938  2 Sheets-Sheet 2

INVENTOR.
BY Christian Iverson,
Hiram A. Sturges
ATTORNEY.

Patented July 11, 1939

2,165,551

UNITED STATES PATENT OFFICE 2,165,551

LAWN MOWER

Christian Iverson, Weston, Iowa

Application September 22, 1938, Serial No. 231,198

5 Claims. (Cl. 56—25)

This invention relates to an improvement in lawn mowers of the class arranged to use a circular, horizontal rotatable cutter-disc for cutting grass at the front of the mower.

Since the mower to be described is designed for cutting very tall grass as well as grass of ordinary heights, means convenient in use are provided for elevating and for lowering the cutter-disc relative to the wheels; and since the cutting of tall grass results in the formation of windrows, adjustable means are provided for mounting parts of the mower so that the cut grass will not interfere with the movements of the mower.

It is the object of the invention to provide a mower which may be operated by either a gasoline or an electric motor, for cutting weeds, grass, or other similar vegetation, and to consist of few and simple parts so that undue friction may be avoided during operation, and that expense of manufacture will be economical.

It has been an object to provide a lawn mower which may be easily moved forwardly by an operator, and may be readily moved on curves to the "right" or "left"; and for these purposes care has been exercised to dispose the motor and other parts in such position that the center of gravity will be disposed centrally of the mower, above the axle, and midway between the wheels. On account of this construction the rear roller may be disposed nearer the wheel-axle than usual to facilitate "steering" and control of movements during operation.

The invention consists of the new and useful construction, combination and arrangement of parts as described herein and claimed, and as illustrated in the drawings, it being understood that changes may be made in form, size, proportions of parts and minor details, said changes being within the scope of the invention as claimed.

Figure 2:
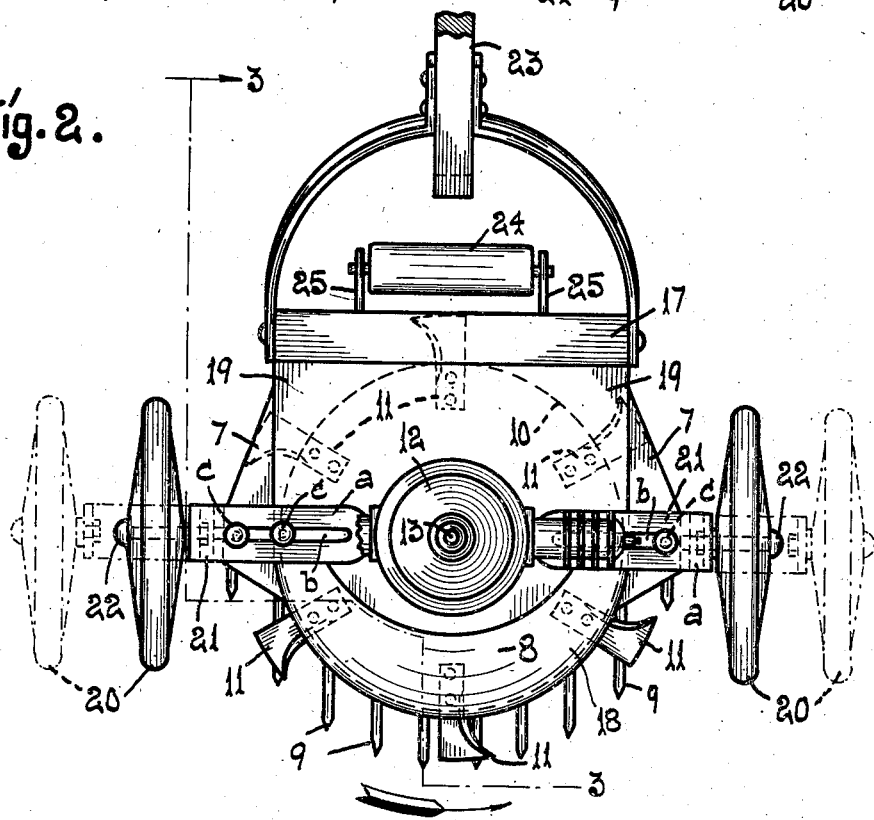

In the accompanying drawings, Fig. 1 is a front end view, showing one embodiment of the invention, and Fig. 2 is a plan view of the same, the handle-bar being broken away.

Figure 3:
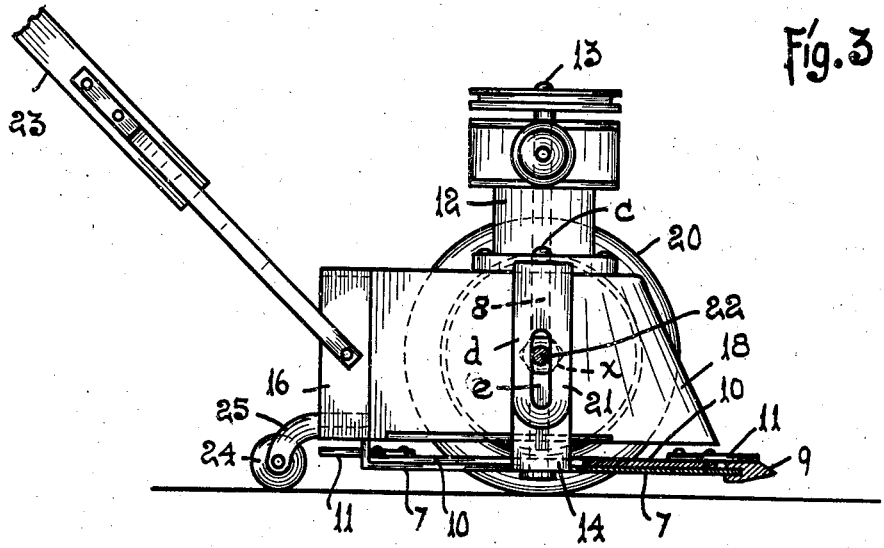
Figure 4:
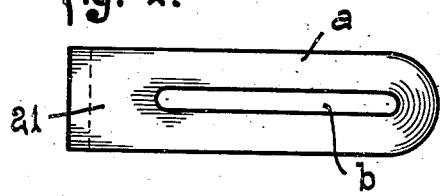
Figure 5:
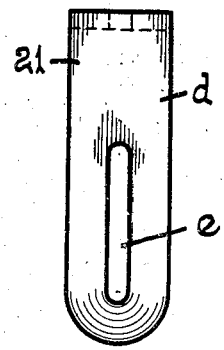
Figure 6:
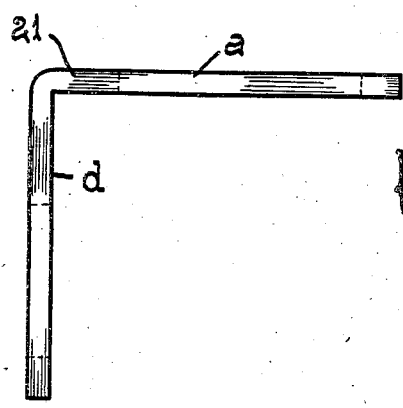

Fig. 3 is a view of the lawn mower in side elevation. Figs. 4, 5 and 6 illustrate details. Fig. 4 is a plan view of a slotted yoke, and Fig. 5 is an end view of the same. Fig. 6 is a side view of the yoke shown in Figs. 4 and 5.

Referring now to the drawings for a particular description, the invention consists, in part, of a flat platform 7 in which is suitably journalled the lower end of a vertical, rotatable drive shaft 8, said platform having a front end of semi-circular form approximately concentric with the shaft, this front end of the platform being provided with uniformly spaced teeth 9, said teeth being disposed parallel relative to the longitudinal axis of the mower.

Numeral 10 indicates a cutter-disc which is suitably secured, centrally thereof, to the vertical shaft 8 near the lower end of said shaft and closely adjacent to the platform. Numerals 11 indicate blades which project outwardly of the edge and secured to said cutter-disc.

While the gasoline motor 12 is shown in the drawings, any suitable power may be used for rotating the vertical shaft 8, and it will be understood that the shaft 13 of the motor is disposed vertically and mounted on the shaft 8.

The platform 7 is provided with a suitable frame consisting, in part, of a pair of upright side-bars 14 which are connected at their upper ends to a horizontal cross-bar 15, and a pair of upright bars 16 at the rear part of the mower which are connected to each other by a cross-bar 17 at the top of the mower. A hood 18 is provided which operates as a deflector during operation when the mower is moved forwardly into standing grass or weeds, said hood covering the space, approximately, from the cross-bar 15 to the cutter-disc 10, and as indicated at 19, cover-plates are used and are suitably secured to the platform and frame-members 15, 16 and 17 which operate to exclude dust and for stabilizing the construction so that all usual stresses due to operation will be sustained.

Means are provided for changing the distance of the wheels 20 from the hood, this being of advantage and quite necessary. Since the cutter-disc rotates in the direction indicated by the arrow in Fig. 2, the tall grass and weeds will be carried by the cutter-disc to the "near" side of the mower and might become wedged between the wheel and hood, and therefore a pair of yokes 21 are adjustably mounted on the cross-bar 15, each yoke having a form of inverted L-shape.

The horizontal arm $a$ of each yoke 21 is provided with a slot $b$, and by means of bolts $c$ which engage in slots $b$, the yokes may be adjusted horizontally of the cross-bar 15.

Each arm $d$ of yokes 21 is provided with a slot $e$ for receiving the stub-axle 22, of a wheel 20, and each axle is secured to an arm $d$ by a threaded nut $x$.

Each wheel 20 is journalled on a stub-axle 22 and since these axles may be adjusted vertically the wheels may be adjusted to permit the cutter-disc to be disposed at selected distances from the ground.

As shown by dotted lines in Figs. 1 and 2 of the drawings, the wheels may be disposed at selected distances from the mower-frame and hood, this distance depending upon the size of the windrow which may be formed between the body of the mower and "near" wheel thereof.

The handle-bar for the mower is indicated at 23, and in order that the draft and traction will be uniform during operation, the wheel at the "off" side of the mower is mounted to permit adjustments to be made, in all respects, the same as the adjustments mentioned for the "near" wheel.

Numeral 24 indicates a roller which is disposed rearwardly of the mower, said roller having trunnions mounted in a pair of arms 25 carried by the frame of the mower.

I claim as my invention:

1. The herein described lawn mower comprising a mower frame, a platform stationary with the frame having a curved end-portion provided with horizontal relatively-parallel teeth, a vertically disposed rotatable power shaft journalled at its lower end in the platform, a cutter-disc carried by the shaft and having blades at its periphery closely adjacent to the teeth of the platform, a pair of ground-wheels at the sides and axially mounted on the mower-frame, and co-operating mechanism including L-shaped yokes on said wheels and frame for supporting said wheels in operative position at selected distances outwardly of the sides of the mower-frame.

2. In a lawn mower, a frame, a horizontal platform on the frame having a semicircular front end-portion provided with forwardly projecting teeth, a rotatable vertical shaft having bearings in the platform, a cutter-disc carried by the shaft and having blades extending outwardly of its periphery, a pair of ground-wheels at the sides of the frame, a pair of yokes of inverted L-shape each providing a horizontal arm for engaging the frame and providing a vertical arm for the axial mounting of a ground-wheel, and means on the frame and each horizontal arm of the yoke for disposing the axial mounting of a ground-wheel at selected distances from said frame.

3. The herein described lawn mower comprising a mower-frame, a horizontal platform on the bottom of the frame having a semicircular front end provided with horizontal teeth, a roller rearwardly of the platform carried by the frame, a vertical rotatable power-shaft journalled in the platform, a cutter-disc carried by the power-shaft and having blades projecting outwardly of its periphery, a pair of ground-engaging wheels at the sides of the frame, a pair of yokes of inverted L-shape each providing a horizontal arm for a mounting thereof on said frame and providing a vertical arm for a mounting on a wheel, and co-operating means on the wheels and yokes for mounting the wheels on selected parts horizontally or vertically of said yokes.

4. The herein described lawn mower comprising a frame, a horizontal platform on the bottom of the frame having a front end of curved form provided with teeth, a roller rearwardly of the platform carried by the frame, a rotatable vertically disposed shaft journalled on the platform, a cutter-disc carried by the shaft and provided with blades projecting beyond its periphery, a hood secured to the frame and disposed above the cutter-disc, a pair of wheels provided with axles at the sides of the frame, a pair of yokes of inverted L-shape each providing a horizontal arm for engaging the frame and providing a vertically disposed arm for engaging a wheel axle, co-operating means on each wheel axle and vertically disposed arm of a yoke for securing a wheel axle at selected parts longitudinally of a vertically disposed arm, and co-operating means on the frame and each horizontal arm of a yoke for disposing a wheel-axle at selected distances from said frame.

5. The herein described lawn mower including a frame, a horizontal platform at the base of the frame, the vertical rotatable shaft journalled on the platform, the cutter-disc provided with blades and movable with the shaft, the roller rearwardly of the platform and carried by the frame, the hood overhanging the cutter-disc and carried by the frame, the ground-engaging wheels at the sides of the frame and provided with axles, and connecting parts on the wheel-axles and said frame operative for elevating or lowering and for disposing the wheel-axles at selected distances from said frame.

CHRISTIAN IVERSON.